Nov. 4, 1969   E. V. JACKSON ET AL   3,476,465
TANGENT SCREEN FIELD OF VISION TESTING APPARATUS
Filed Jan. 28, 1966   4 Sheets-Sheet 1

INVENTORS
EARL V. JACKSON
RICHARD C. MOHRMAN

BY

ATTORNEY

Nov. 4, 1969  E. V. JACKSON ET AL  3,476,465
TANGENT SCREEN FIELD OF VISION TESTING APPARATUS
Filed Jan. 28, 1966  4 Sheets-Sheet 3

FIG. 5

INVENTORS
EARL V. JACKSON
RICHARD C. MOHRMAN

BY *Arthur L. Nelson*

ATTORNEY

Nov. 4, 1969  E. V. JACKSON ET AL  3,476,465
TANGENT SCREEN FIELD OF VISION TESTING APPARATUS
Filed Jan. 28, 1966  4 Sheets-Sheet 4

INVENTORS
EARL V. JACKSON
RICHARD C. MOHRMAN

BY

ATTORNEY

United States Patent Office 3,476,465
Patented Nov. 4, 1969

3,476,465
TANGENT SCREEN FIELD OF VISION TESTING APPARATUS
Earl V. Jackson, Penfield, and Richard C. Mohrman, Irondequoit, N.Y., assignors to Bausch & Lomb Incorporated, Rochester, N.Y., a corporation of New York
Filed Jan. 28, 1966, Ser. No. 523,717
Int. Cl. A61b 3/06
U.S. Cl. 351—23                    4 Claims

ABSTRACT OF THE DISCLOSURE

A tangent screen vision testing apparatus is disclosed including a movable projector for directing a spot on a plane surface. A chart marker is coupled to the projector to locate the spot on the surface while at the same time correlating the image of the light spot on the retina of an eye being tested with the position of the marker on the chart.

---

Figure 1:
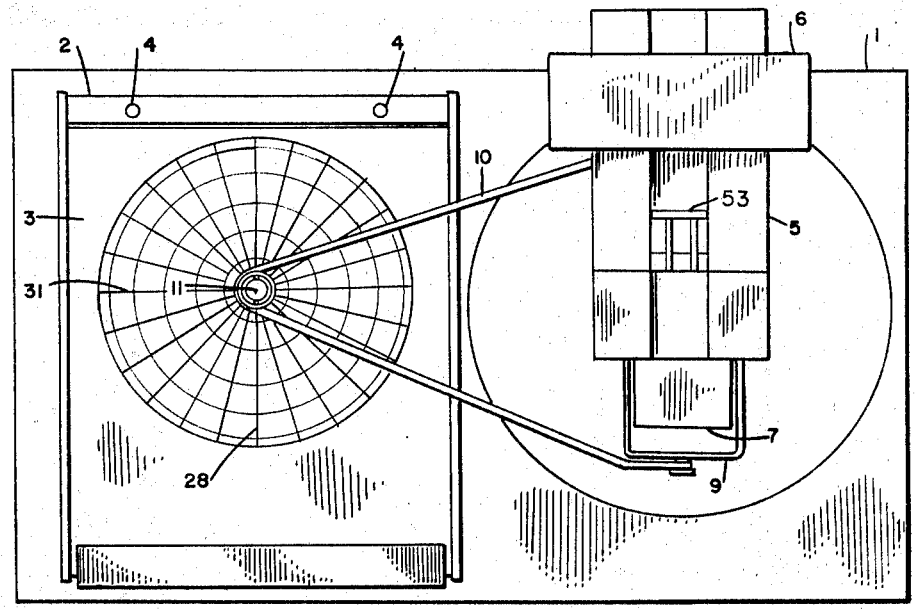

This invention relates to a vision testing device and more particularly to a vision testing device for detecting the light sensitivity of the retina in an eye.

To provide the greatest usefulness a vision testing device for determining the sensitivity of the retina in an eye must provide an accurate recording over the surface of the retina being tested. This may be accomplished by fixing the eye on a fixation point while a target such as a light spot is moved over a screen to create an image which falls on the retina. The image of the spot on the screen is moving across the retina simultaneously with the spot movement on the screen. By producing a systematic scanning over the surface of the screen the image likewise scans the surface on the retina. It is also necessary that the corresponding points on the screen and retina may be recorded on a chart to produce a permanent record so that in the future a similar reading may be taken and the points may again be plotted to produce an accurate comparison with the previous reading.

Accordingly this invention is intended to provide a visual scanning means whereby an image is sensed on the retina of an eye of a patient. The optical scanning is mechanically coordinated to reproduce a scanning on a chart surface which is a simulated retina surface to provide a permanent record of the vision tested.

It is an object of this invention to provide a record of light sensitivity of the retina of an eye.

It is another object of this invention to plot points on a chart which are correlated with similar points on the surface of a retina upon which images are reproduced from a spot scanning a screen.

It is a further object of this invention to project a light spot over the surface of the screen the image of which is sensed on the retina of an eye and a mechanical plotting of the corresponding points of a chart are produced to provide a permanent record of the sensitivity over the surface of the retina.

It is a further object of this invention to provide a record on a chart of the sensitivity of the retina of an eye to an image of the spot on the screen which is formed on the retina of the eye.

The objects of this invention are accomplished by providing an optical system having illuminating means enclosed within a housing. A screen is positioned before the patient and includes a point of fixation for focusing the eye of the patient. The optical system is suspended by a gimbal support to permit universal movement of the optical system and projection of the spot over the surface of the screen. A mechanism connected to the housing for the optical system carries a marker arm which extends over a chart carrying table for plotting points on the chart. The mechanism is correlated to reproduce a motion of the marker over the surface of the chart to simulate the movement of the spot on the screen, the image of which in turn scans the retina of the eye. In this manner the prescribed area of the retina is scanned and the sensitivity of the retina as indicated by the patient is recorded to thereby indicate blind spots, areas of reduced sensitivity, etc.

The preferred embodiment of this invention is described in the following paragraphs and illustrated in the attached drawings.

Figure 2:
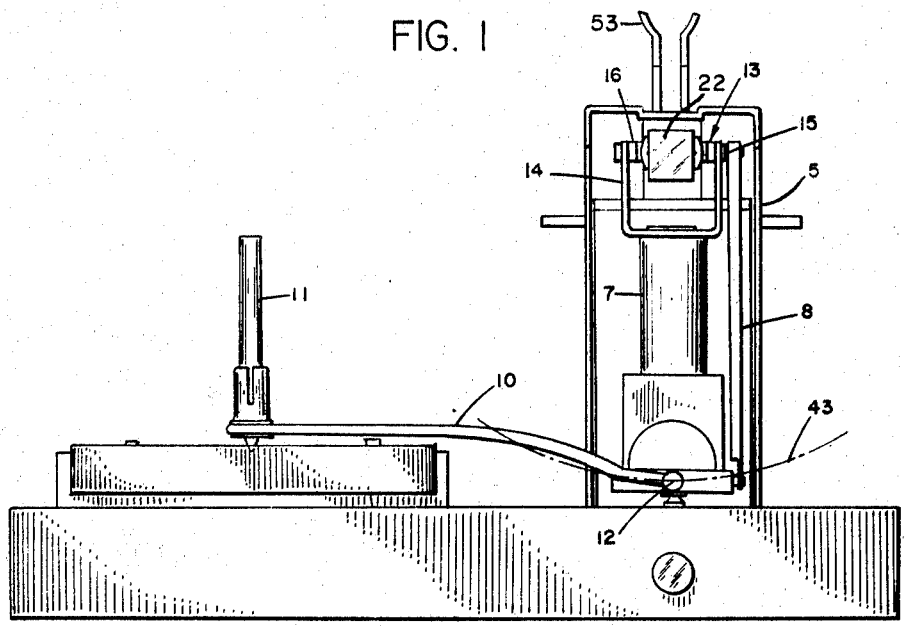
Figure 3:
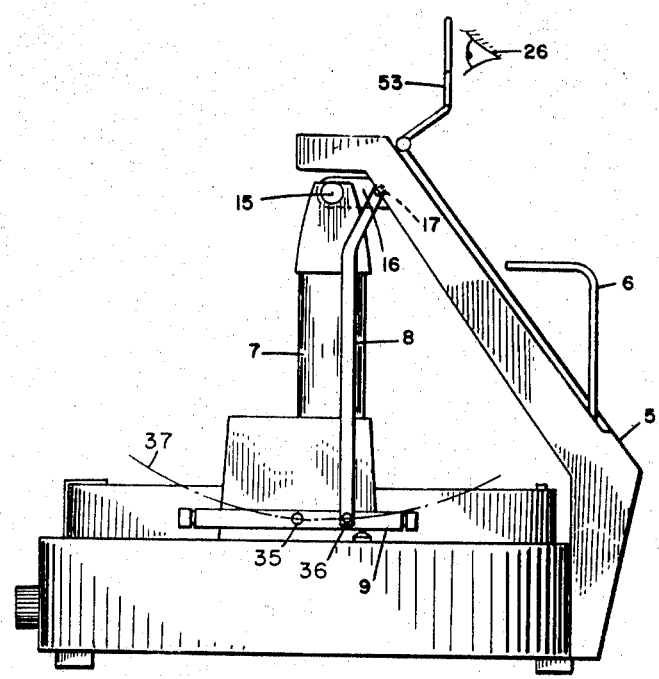
Figure 4:
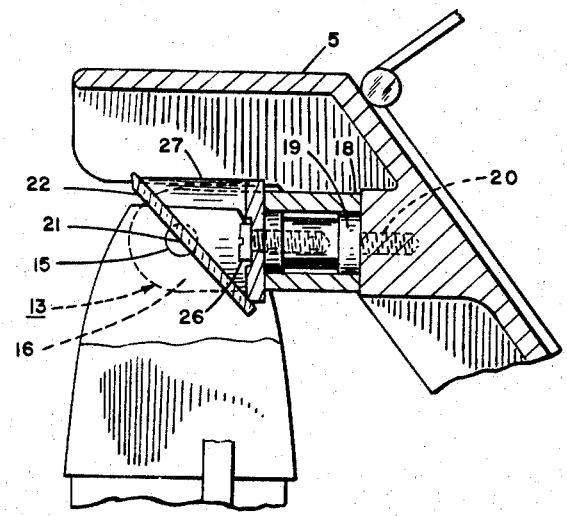
Figure 6:
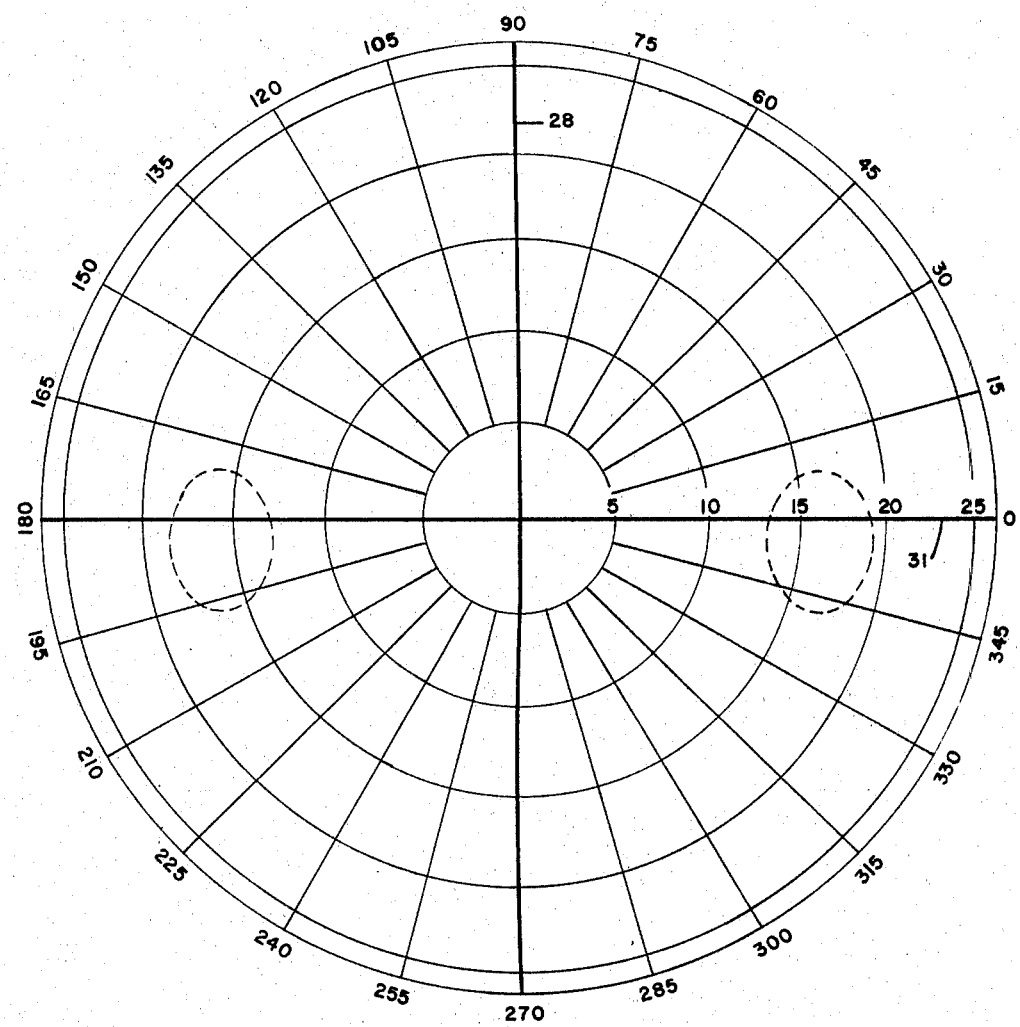

FIGURE 1 illustrates a plan view of the projector.
FIGURE 2 illustrates a front view of the projector.
FIGURE 3 illustrates a side view of the projector.
FIGURE 4 illustrates a cross section view illustrating the gimbal suspension of the optical system housing.
FIGURE 5 illustrates a geometrical relationship of the projector and screen for testing vision.
FIGURE 6 illustrates an impression of the movement of the marker as the spot moves on the screen in concentric circles and radial lines.

FIGURE 1 illustrates a base 1 supporting a table 2 upon which is placed a chart 3. The chart is aligned on the alignment pins 4 which are received in holes of the chart paper.

The base 1 also supports a frame 5 mounted on the base 1. The frame carries a chin support 6. The frame supports the optical housing 7 by a gimbal support which will be discussed subsequently. Carrier 9 is pivotally mounted to the housing 7 and a link 8 at the pivot points 35 and 36. The carrier 9 pivotally carries the marker arm 10. The marker arm 10 receives a marker 11.

The marker arm 10 pivots on its axis 12 as the marker 11 follows the chart 3. The housing 7 pivots on the gimbal 13. The gimbal permits pivoting of the housing on mutually perpendicular axes and thereby permits universal movement of the housing. The yoke 14 carries the housing 7 and pivots on the pin 15 which is supported on the fork 16. This permits pivoting of the housing 7 in a plane perpendicular to the plane of the surface of the drawing. The pin 15 is also shown in FIGURE 3 and permits the pivoting of the housing 7 while simultaneously permitting the link 8 to pivot about a pin 17 on the fork 16. A lower end of the link 8 pivotally supports the carrier 9. The lower end of the link 8 also is pivotally connected at the pivot point 35 to the carrier 9. The fork 16, carrier 9, link 8, and housing 7 effectively form a parallelogram to maintain the pivotal axis 12 of the marker arm 10 in a substantially constant attitude. Accordingly, as the housing 7 and link 8 pivot on their parallel axes the marker 11 maintains a constant recording on the chart.

A mutually perpendicular axis of rotation of the fork 16 is created by the sleeve portion 18 which rotates on the cylindrical head 19 of screw 20. The screw 20 is fastened into the frame 5 and is non-rotatably fixed relative to the frame 5 once it is fastened on the frame. The sleeve portion 18 of the fork 16 rotates on the cylindrical portion 19 to permit rotation of the housing 7 on an axis mutually perpendicular of the axis of the pin 15. The two mutually perpendicular axes formed by the gimbal pass through a point 21 on the surface of the mirror 22. The point 21 on the mirror 22 is coincidental with the optical axis of the optical system which reflects a beam of light to form a spot on the screen 23.

The marker arm 10 pivots about its axis 12 when the housing 7 rotates about the axis centrally located within the sleeve portion 18 of the fork 16. The tilt of the marker 11 due to pivoting of the marker arm 10 is relatively small as the rise and fall of axis of rotation of the marker arm 10 on axis 12 is relatively small. The axis of rotation of the axis 12 swings through an arcuate line 43. The movement of the marker arm produces a maximum length line on the chart 3 of meridian 31 as the axis of rotation of the arm 10 swings through the bottom of the arcuate path 43. The axis of rotation of the arm 10 swings slightly above this plane of both ends of its central position. There is a slight foreshortening of the lines produced by the movement of the marker on the chart after axis 12 swings away from the bottom of the arcuate line 43. This slight foreshortening of the marker movement and tilt of the marker are compensated for by the shape of the chart.

In viewing the projector in FIGURE 3 the housing 7 and the link 8 pivot about the axis of the pins 15 and 17 respectively. The axis of the pivot point 35 of the carrier 9 swings in an arcuate path 37 as illustrated in FIGURES 3 and 5 when the housing 7 pivots on the axis of pin 15. When the optical axis projects a light beam on the mirror it is reflected at the point 21, and a spot is produced on the fixation point 25 then the optical axis is in a vertical position. The beam of light is at an angle of approximately 6 degrees with a horizontal line as it is reflected from the mirror to the screen as shown in FIGURE 5. This deviation from a horizontal position is to accommodate a position of the eye 26 slightly above the projector to prevent any obstruction of vision by the projector. The eye is fixed on the fixation point 25 which is in a horizontal line. As the projector swings to the right the spot swings upward When the optical axis is swung left of a vertical position a greater angle of movement is necessary to swing the spot through an equivalent downward distance on the screen 23. Accordingly the two positions of the carrier are shown which will produce a movement of the spot on the screen an equivalent distance above and below the fixation point. The mirror 22 is fixed to the frame 5 by means of the screw 26 fastened to the mirror support 27. The cylindrical portion 19 of the screw 20 is slightly longer than the sleeve portion 18 to provide a fixed mount for the mirror 22 relative to the frame 5. When the housing for the optical system pivots about the axis of rotation of the sleeve portion 18 the marker arm 10 pivots about the axis 12 and a slight inclination to a vertical position is created as the marker 11 moves from one side of the chart to the other.

Considering that the light beam is 6 degrees inclined to a horizontal position when the spot is projected on the fixation point a greater movement of rotation is required of the optical axis in the left hand direction to produce an equivalent movement from the spot on the screen as compared to the movement of the right hand direction of the optical axis to produce an equal rise of the spot on the screen. Accordingly the carrier 9 must rise to a higher position in the extreme limit of swing on the left hand side than the position of the carrier in the extreme position on the right hand side. When the optical housing is pivoted about the axis of pin 15 a greater curvature of the meridian 28 will be produced on the lower portion of the chart as shown in FIGURES 1 and 6 than on the upper portion of the chart. This is caused by the arcuate movement of a point on the rotational axis of marker arm 10 which will swing to a higher point when the carrier 9 swings to the left than when the carrier swings to the right as shown in FIGURE 3 to produce an equivalent movement of the spot downwardly as compared to its upward movement on the screen respectively. The chart shown in FIGURE 6 is drawn by the movement of the marker as the spot on the screen moves in concentric circles and moves on segments of radial lines from the fixation point on the screen.

The optical system includes a light 29 projecting a beam of light through the lens 32 and 33 which is reflected on the mirror 22. The mirror reflects a beam of light to form a spot on the screen 23.

The eye 26 of the patient is positioned behind the sight 53 and is fixed by viewing the fixation point 25 as the chin rests on the chin rest 6. The relationship of the operator to the chart is the same as the relationship of the patient to the screen.

The device operates in the following manner. The operator positions the patient behind the projector with the patient's chin on the chin rest 6 and the eye viewing the preset position. The eye is fixed to look directly at the fixation point 25 which is horizontally positioned in front of the patient's eye at a distance of one meter. The patient's eye is fixed in this position when the visual testing is done. The marker arm 10 is manipulated by the operator to produce a scanning of the marker 11 across the chart which is generally as illustrated in FIGURE 1. The scanning of the marker over the surface of the chart is made as completely as desired by passing over a plurality of circles or meridians. When the patient senses lack of vision in the eye being tested in sensing the spot he indicates to the operator such a condition. Accordingly the operator marks the chart with the pen and in this manner lack of sensitivity and blind spots are detected and a recording is made. The chart then provides a permanent record of the scanning which may be accurately duplicated at some future date. If a change is present in the eye of the patient this may be detected by a comparison between charts made on some subsequent date. The tangent screen visual testing device provides an accurate means of correlating sensitivity and lack of sensitivity of the retina by reproducing the scanning of the spot which is projected on the screen which simultaneously produces a scan of the image of the spot across the retina of the eye which is also simultaneously reproduced through the mechanical mechanism to plot the corresponding points on the chart for a permanent record in visual examination.

The preferred embodiments of this invention have been illustrated and described and it is understood that other devices may be devised which would fall within the scope of the invention.

We claim:

1. A visual testing device for projecting a light spot on a screen for testing and recording the field of vision of a patient's eye wherein the operator's position is opposite the patient's position comprising, means defining an optical system including illuminating means for projecting a beam of light on said screen, a housing means enclosing said optical system, a supporting means pivotally supporting said housing means for pivotal movement in first and second axes of rotation, sight means for fixing the position of a patient's eye to sense the scanning of the spot on the screen, means defining a table positioned laterally from said sight means, means for receiving a chart on said table so that the patient's eyes and said chart can be readily observed from said operator's position, a first arm for receiving and positioning a marker adjacent said chart for marking said chart, second and third arms, means for pivotally coupling said second and third arms, said housing and a portion of said support means together to effectively define a parallelogram for maintaining said second arm at substantially constant attitude with respect to said chart as said housing means is pivoted about the first axis of rotation, means pivotally coupling said first arm to said second arm so that said first arm controls the movement of said housing means and correlates the position of the projection of the light spot on said screen and the image on the retina of an eye to the position of the marker relative to said chart.

2. A visual testing device for projecting a light spot on a screen for testing and recording the field of vision of a patient wherein the operator's position is opposite the patient's position comprising means defining an optical axis including a mirror and illuminating means for projecting a beam of light on said screen to form a spot, supporting means including means defining a housing for said optical system for providing rotational movement of said housing in first and second axes of rotation, sight means positioned adjacent said mirror for fixing the position of an eye of a patient to be tested to sense the scanning of the spot on said screen, means defining a table positioned laterally from said sight along a direction generally normal to the line of vision through said sight, means for receiving a chart on said table so that the patient's eyes and said chart can be observed from said operator's position, first and second arms, means for pivotally coupling said first and second arms, said housing and a portion of said support means together to effectively define a parallelogram for maintaining said second arm at a substantially constant attitude with respect to said chart as said housing means is pivoted about the first axis of rotation, a third arm for receiving and positioning a marker adjacent said chart for marking said chart, means coupling said third arm to said first arm for controlling the rotational movement of said housing and including a pivotal support on said first arm for pivotal movement in a plane normal to said first axis of rotation and correlating the position of the spot on the screen and the image of the spot on the retina of the eye to the position of the marker relative to said chart.

3. A tangent screen field of vision testing apparatus for projecting a light spot on a substantially plane surface for testing and recording the field of vision of a patient's eye and wherein the operator's position is opposite the patient's position comprising:

a projector for projecting a light spot on said plane surface;

a base;

a supporting means mounted on said base rotatably supporting said projector for movement along at least two axes of rotation;

sight means mounted on said base adjacent said projector for viewing said light spot on said plane surface for correlating the light spot on said plane surface with an image of the light spot on the retina of a patient's eye observing the light spot through said sight means;

means mounted on said base for receiving a recording chart so that the patient's eyes and the chart can be readily observed from said operator's position;

an elongated arm for receiving a marker for marking said chart, and means coupling said elongated arm to said projector so that the position of the light spot on said plane surface is controlled by the position of said marker and the image of the light spot on the retina of the eye tested is correlated with the position of the marker on the chart.

4. A tangent screen vision testing apparatus for projecting a light spot on a substantially plane surface for testing and recording the field of vision of an eye comprising:

a base;

a mirror stationarily mounted on said base;

a projector including a source of radiation and an optical system for producing a beam of radiation;

means for mounting said projector to direct a beam of radiation toward said mirror for reflection on said plane surface including a pivotal support providing movement about two axes of rotation relative to said mirror for moving the light spot on said plane surface;

sight means mounted on said base adjacent to said mirror for viewing said light spot on said plane surface to correlate the light spot with an image of the light spot on the retina of an eye observing the light spot through said sight means;

means mounted on said base for receiving a chart in a generally horizontal position;

an elongated arm extending over said chart for receiving a marker for marking said chart, and means for coupling said elongated arm to said projector so that the position of said marker controls the position of said light spot on said plane surface and the image of the light spot on the retina of the eye tested is correlated with the position of the marker relative to the chart, said means including a second arm pivotally coupled to said elongated arm, said projector and the mounting means for the projector wherein said second arm remains in substantially parallel relation to said chart as said projector is pivoted about one of said two axes of rotation in response to a force applied to said elongated arm.

References Cited

UNITED STATES PATENTS

| | | | |
|---|---|---|---|
| 1,796,359 | 3/1931 | Cameron | 351—30 |
| 1,899,135 | 2/1933 | Cameron | 351—30 |
| 2,564,794 | 8/1951 | Shekels | 351—32 X |
| 3,235,321 | 2/1966 | Jayle et al. | 351—23 X |
| 3,269,792 | 8/1966 | Mirsky | 351—23 |
| 3,317,268 | 5/1967 | Oswold | 351—23 X |

DAVID SCHONBERG, Primary Examiner

P. A. SACHER, Assistant Examiner

PO-1050
(5/69)

UNITED STATES PATENT OFFICE
CERTIFICATE OF CORRECTION

Patent No. 3,476,465          Dated     November 4, 1969

Inventor(s)   Earl V. Jackson and Richard C. Mohrman

It is certified that error appears in the above-identified patent and that said Letters Patent are hereby corrected as shown below:

Col.5, line 25, change "on" to -- onto --
      line 32, delete "a supporting"; after "base" insert --for--
      line 33, change "along" to -- about --
      line 35, after "adjacent" insert -- to --
      line 38, change "a" to -- the --
      line 39, change "observing" to -- which observes --
      line 42, change "eyes" to -- eye --
      between lines 43-44, insert "a marker for marking said chart;"
      line 44, change "a" to -- said --
      lines 44-45, delete "for marking said chart," and insert a semi-colon (;) before "and"
      line 46, after "means" insert -- for mechanically --
      lines 46-47, change "so that" to -- to control --
      line 48, delete "is controlled by the position of";
          before "said" insert -- with --;
          delete "and" and insert -- whereby the position of --
      line 49, after "eye" insert -- being --

Col.6, line 1, after "is" insert -- controlled by and --
      line 25, after "for" insert -- mechanically --
      line 30, after "means" insert -- for coupling --

SIGNED AND
SEALED
NOV 10 1970

(SEAL)
Attest:

Edward M. Fletcher, Jr.
Attesting Officer

WILLIAM E. SCHUYLER, JR.
Commissioner of Patents